June 4, 1929.  G. STARKS  1,715,682

DRAWBAR HITCH FOR TRACTORS

Filed Nov. 28, 1927   2 Sheets-Sheet 1

INVENTOR.
George Starks.
BY
his ATTORNEYS.

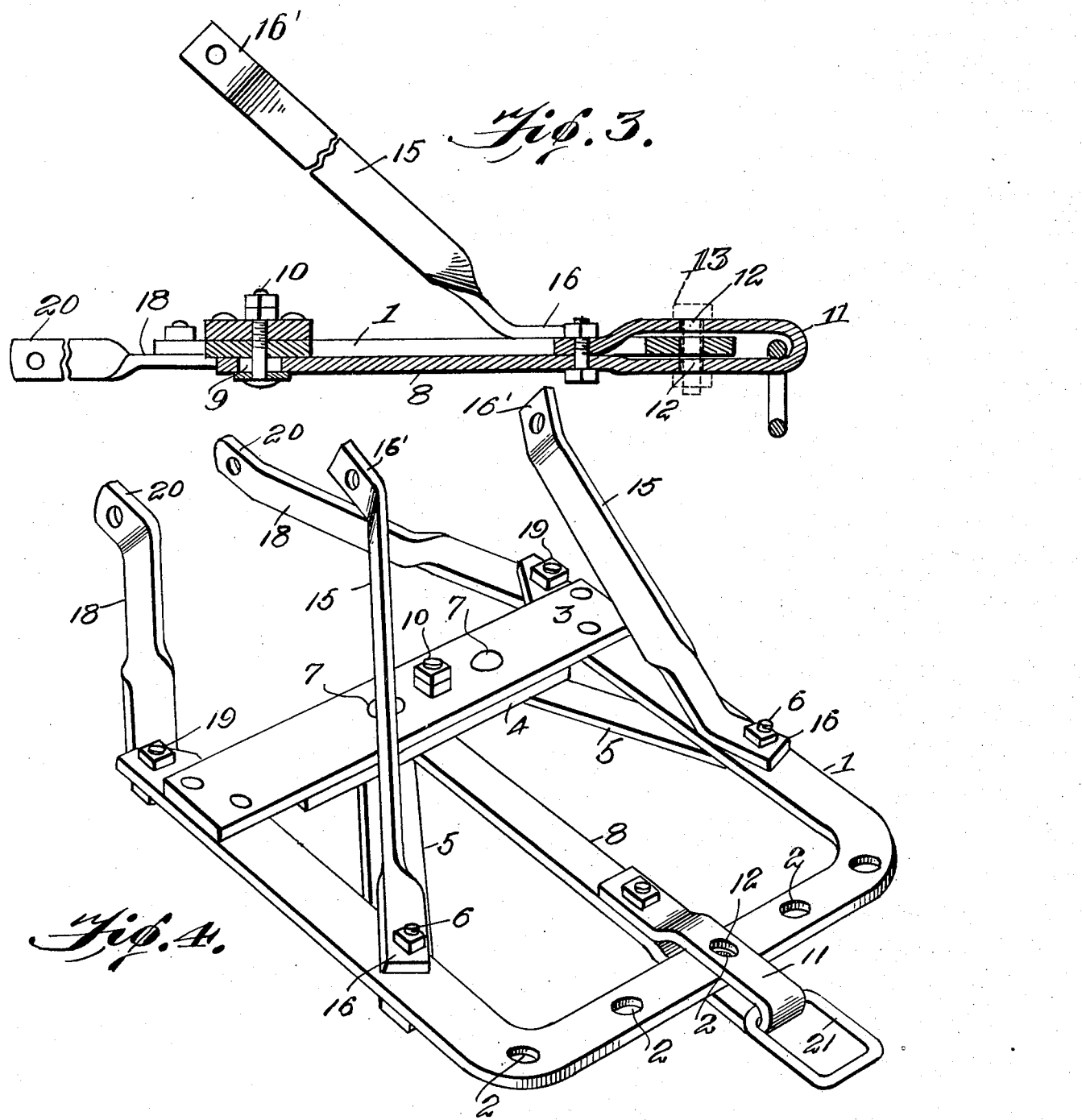

Patented June 4, 1929.

1,715,682

UNITED STATES PATENT OFFICE.

GEORGE STARKS, OF WILSONVILLE, NEBRASKA.

DRAWBAR HITCH FOR TRACTORS.

Application filed November 28, 1927. Serial No. 236,256.

This invention relates to a draw-bar hitch for tractors, and has for its object the construction of a simple and efficient device whereby machines can be attached to a tractor.

Another object of the invention is the construction of an attaching device, which is normally fastened to the gear housing of a tractor, and which will prevent the tractor from upsetting backwards.

A still further object of the invention is the construction of an attaching device or "hitch" device, whereby the hitch is regulated on the main bar several inches from either side of a central point, without moving any of the machinery at any time.

With the foregoing and other objects in view, my invention comprises certain novel constructions, combinations and arrangements of parts as will be hereinafter fully described, illustrated in the accompanying drawings, and more particularly pointed out in the appended claim.

In the drawings:

Figure 1 is a view in side elevation of my device, showing the same attached to a gear housing of a tractor, while

Figure 3 is a longitudinal central sectional view of my device, while

Figure 4 is a perspective view of the same.

Figure 1:
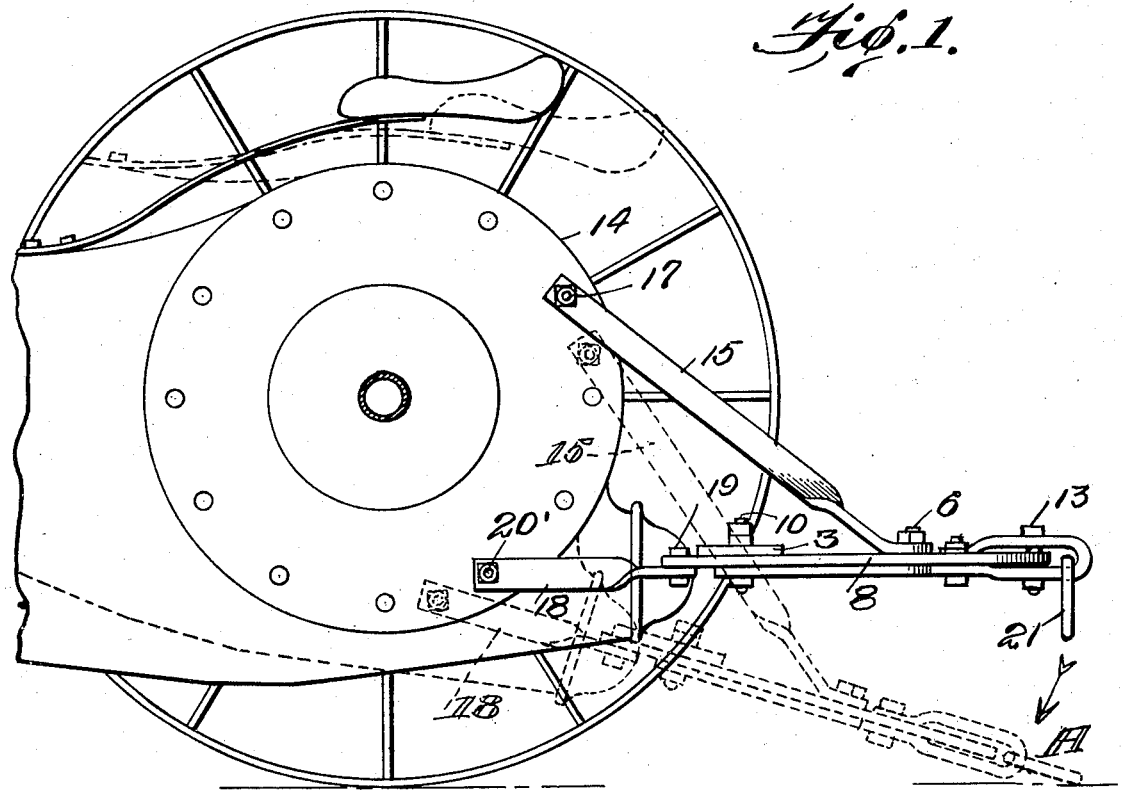

Referring to the drawings by numerals, 1 designates the U-shaped frame, which is provided with a plurality of large apertures 2. Secured near the inner ends is a transverse plate 3 against the bottom of which is placed a filler element or block 4, for the purpose hereinafter described.

Figure 2:
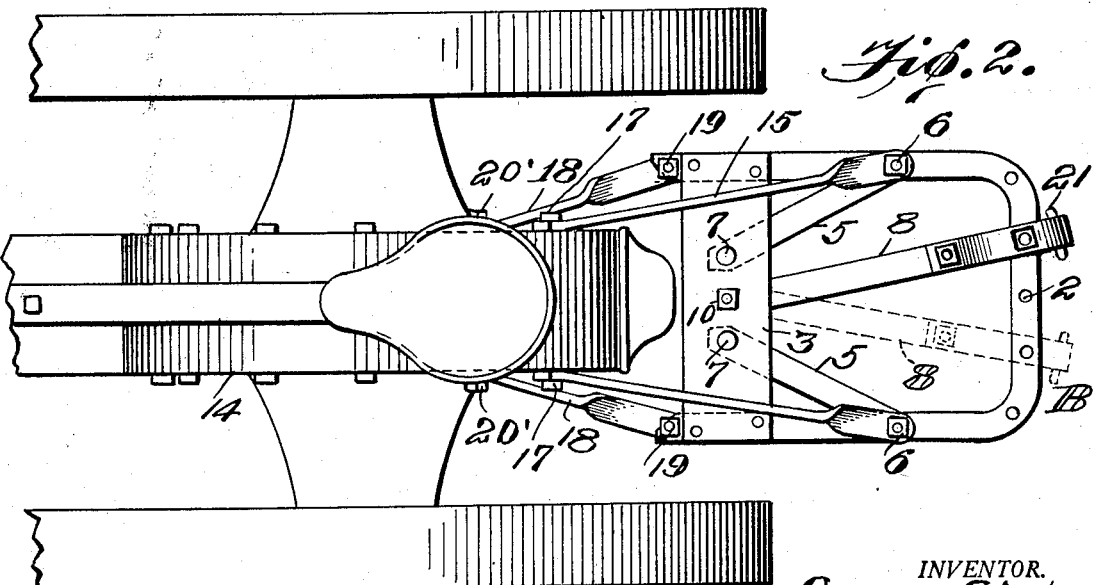
Figure 2 is a top plan view of the same.

A pair of horizontal bottom braces 5 are fastened at their outer ends by bolts 6 against the under face of frame 1, and their inner ends are spaced and fastened against block 4 by bolts 7. A swinging hitch bar 8 is provided near its inner end with a large slot 9, through which extends bolt 10. This slot 9 is provided for making the adjustment of bar 8 easy upon the frame 1. The outer end of the swinging hitch bar 8 is formed into a loop 11 that surrounds the apertured end of frame 1. The loop 11 is provided with registering apertures 12, which also register with the apertures 2 in frame 1. A suitable bolt 13 is placed in the apertures 12 and 2 to hold the hitch bar in different adjusted positions upon the frame 1, as shown in full lines, Figs. 2 and 4 and by dotted lines B in Fig. 2. The bolt 10 is placed between bolts 7; consequently, the hitch bar 8 is pivotally mounted at its inner end between the inner ends of braces 5. The filler block 4 serves to properly position the inner ends of braces 5 and bar 8.

To mount the frame 1 securely upon the gear housing 14, I provide two primary gear-housing connecting brace bars 15; these bars 15 are inclined, and are provided with flat feet 16 that rest flat upon the top of frame 1, and through which feet extends bolt 6; the upper ends of bars 15 are flat, as at 16′, and these ends 16′ are positioned in a vertical plane, so as to bear flat against the vertical side faces of gear housing 14. Through these flat ends 16′ extend bolts 17 of the gear housing 14.

Auxiliary gear-housing connecting bars 18 are provided; these bars are positioned horizontally and bear flat against the under face of frame 1, at their inner ends, with bolts 19 fastening said bars 18 to the frame. The outer ends 20 of said bars 18, are bent into a vertical plane, so as to bear flat against the vertical side faces of the gear housing 14. Bolts 20′ extend through the side faces of the gear housing and through the flat ends 20 of bars 18, whereby these bars are securely fastened to said gear housing.

My device is a very rigid structure, so that if the tractor starts to upset backwards, as shown by dotted lines A, Figure 1, the device will hit the ground, and thereby prevent said tractor from upsetting. However, the adjustment of the swinging hitch bar 8 can easily be accomplished upon frame 1, to obtain the desired hitch for the machine that is to be attached to the tractor.

It can be said that the hitch bar 8 has a "swinging" radius of twelve inches on either side of the central hole or aperture in frame 1. The accurate attaching or hitching of a machine to the tractor can thus be readily accomplished without moving any of the machinery.

My hitching device is particularly adapted for the tractor known as Fordson, and by the use of my device, a great many machines can be quickly attached to the tractor. This attaching may be through the medium of the ring or link 21 to which an ordinary clevis may be secured.

While I have described the preferred embodiment of my invention and illustrated the same in the accompanying drawings, certain minor changes or alterations may appear to one skilled in the art to which this invention relates, and I, therefore, reserve the right to make such changes or alterations as shall fairly fall within the scope of the appended claim.

What I claim is:

In a device of the class described, the combination of a U-shape horizontal frame provided with a plurality of vertical, large apertures in its outer end, a horizontal transverse plate secured at its ends to the top of said U-shape frame, a filler block between the sides of said frame and secured to the under face of said transverse plate, horizontal braces secured at their outer ends against the under face of said U-shape frame and at their inner ends to the under face of said filler block, a swinging hitch bar provided with a large slot at its inner end, said slotted end of the hitch bar positioned against the under face of said filler block, a bolt extending through said slot, filler block and transverse plate securing said parts together, said hitch bar looped around the outer apertured end of said U-shape frame, said looped end provided with registering apertures, said registering apertures registering also with the apertures in said U-shape frame, a pair of inclined gear-housing brace bars provided at their inner ends with flat feet secured against the upper face of said U-shape frame, said inclined gear-housing brace bars provided with upper flat ends arranged in vertical planes, and a second set of horizontal gear-housing brace bars fastened at their inner ends flat against the ends of said U-shape frame and having their outer ends positioned in vertical planes, whereby the outer ends of said inclined brace bars and the outer ends of said horizontal brace bars are adapted to engage the vertical side faces of a gear housing, substantially as shown and described.

In testimony whereof I hereunto affix my signature.

GEORGE STARKS.